July 22, 1924.
H. C. SCHAPER
AUTOMATIC SCALE
Filed Sept. 12, 1918
1,502,443
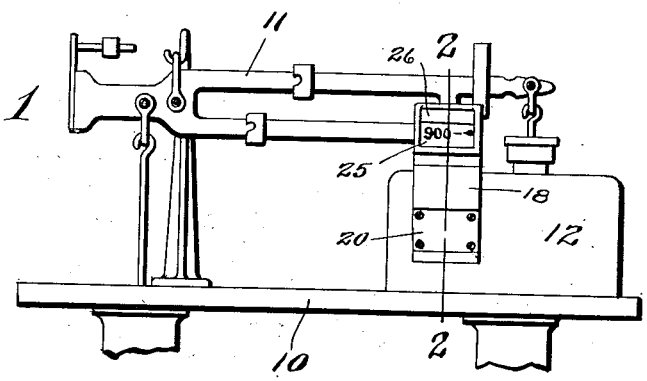
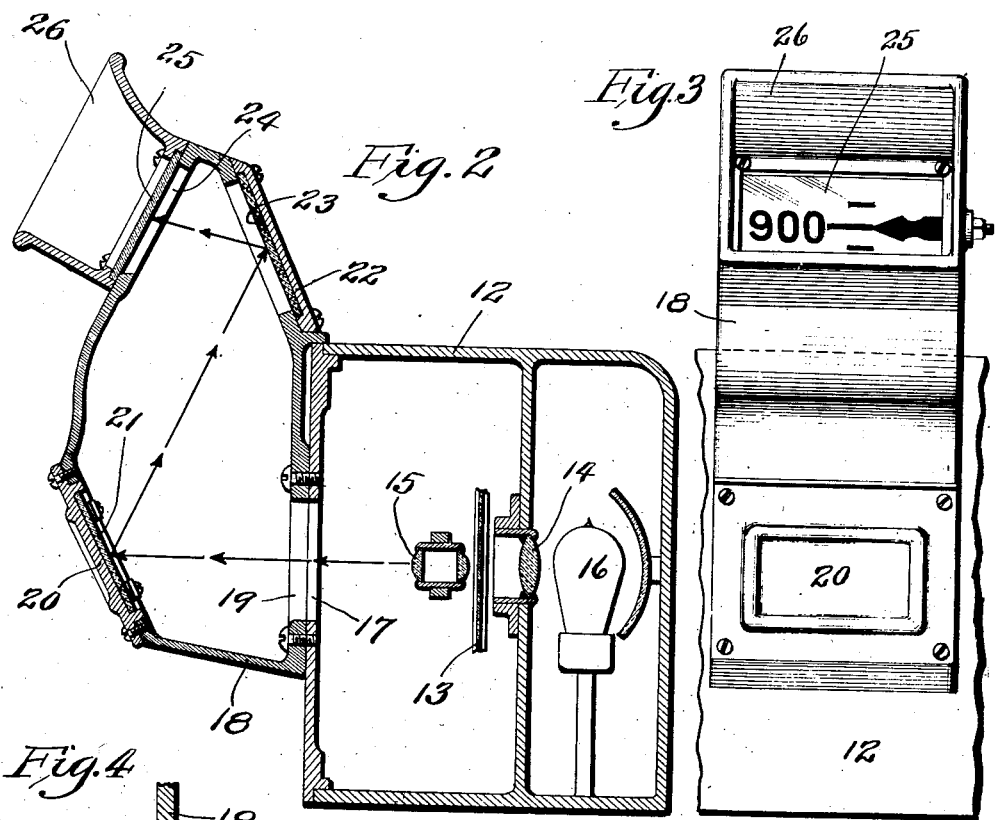
Inventor
Henry C. Schaper
By F. H. Carnwall, Atty.

Patented July 22, 1924.

1,502,443

UNITED STATES PATENT OFFICE.

HENRY C. SCHAPER, OF ST. LOUIS, MISSOURI, ASSIGNOR TO THE GENERAL AUTOMATIC SCALE COMPANY, OF ST. LOUIS, MISSOURI, A CORPORATION OF MISSOURI.

AUTOMATIC SCALE.

Application filed September 12, 1918. Serial No. 253,670.

*To all whom it may concern:*

Be it known that I, HENRY C. SCHAPER, a citizen of the United States, residing at the city of St. Louis, State of Missouri, have invented a certain new and useful Improvement in Automatic Scales, of which the following is a full, clear, and exact description, such as will enable others skilled in the art to which it appertains to make and use the same, reference being had to the accompanying drawings, forming part of this specification.

My invention relates generally to automatic scales, and more particularly to the type of weight indicating mechanism disclosed in my copending patent application for weight indicator for scales, filed December 18, 1917, Serial Number 207,683.

In my application aforesaid, the marks of a graduated scale and weight indicating numerals are projected directly onto a ground glass through the medium of lenses and source of light, and in order to secure the proper magnification or size of the marks and numerals upon the ground glass or screen, it is necessary to arrange the same a substantial distance away from the lenses and source of light. To accomplish the desired results, I propose to combine with the main housing of the indicating mechanism disclosed in my application aforesaid, a secondary housing which projects a substantial distance forwardly and upwardly from said main housing and carries at its forward upper end a screen or ground glass.

It is the principal object of my present invention to combine with the secondary housing a screen or ground glass and reflecting surfaces such as mirrors, the same being disposed so as to produce the desired magnification of the graduated scale marks and indicating numerals upon said ground glass the latter being elevated with respect to the main housing of the apparatus so as to occupy a position where it can be readily observed by the weighman or person in charge of the scales.

My improved structure involves certain principles of the periscope in that the light rays are, by an arrangement of reflecting surfaces, caused to travel substantially vertical paths and thus be projected onto the screen or ground glass, which is elevated a substantial distance with respect to the source of light and lenses within the main housing of the apparatus.

With the foregoing and other objects in view, my invention consists in certain novel features of construction and arrangement of parts hereinafter more fully described and claimed and illustrated in the accompanying drawings, in which—

Figure 1 is a front elevational view of the upper portion of a beam scale with a weight indicating device associated therewith, and with my improved housing in position upon the main housing of the indicator.

Figure 2 is an enlarged vertical taken approximately on the line 2—2 of Figure 1.

Figure 3 is a front elevational view of the housing constructed in accordance with my invention.

Figure 4 is a detail section showing a pointer utilized in connection with my improved device.

Referring by numerals to the accompanying drawings which illustrate a practical embodiment of my invention, 10 designates the table of an ordinary beam scale, 11 the beam or lever thereof, and 12 the main housing of the weight indicating apparatus. This weight indicating apparatus includes a transparent member 13 bearing a graduated scale and which is actuated by loads placed on the scale platform. This transparent member is arranged for vertical movement between a condensing lens 14 and projecting lenses 15, and there being an electric lamp 16 or other suitable source of light positioned to the rear of condensing lens 14. Formed in the front wall of the main housing 12 and in alignment with the axes of the lenses 14 and 15, is an aperture 17. Secured in any suitable manner to the front wall of housing 12 is the body 18 of my improved device, the same being preferably cast and in the form of a short vertically disposed box-like structure which extends a short distance above the top of housing 12. Formed in the lower portion of the rear wall of this auxiliary housing is an aperture 19 which coincides with aperture 17. A removable plate 20 constitutes the lower portion of the front wall of housing 18, and arranged on the inner face of this plate is a mirror 21, or like element, having a reflecting surface. This reflecting surface is disposed directly opposite the apertures 17 and 19 and it occupies a plane at an angle of approximately sixty degrees relative to a horizontal plane. A removable plate 22 serves as the upper portion of the rear wall of housing 18, and arranged on the inside of said plate is a mirror 23 or other element having a reflecting surface. This reflecting surface 23 is substantially parallel with the reflecting surface 21 and therefore occupies a plane at an angle of approximately sixty degrees relative to a horizontal plane.

Formed in the upper portion of the front wall of housing 18 and directly opposite the reflecting surface 23, is an opening 24, and positioned directly over said opening and closing the same is a screen member 25, preferably a section of ground or colored glass. Secured to the upper portion of the front wall of the housing 18 around this screen is an outwardly projecting wall 26, the same serving as a hood to partially shield the screen from direct, external light rays.

Arranged in the right hand side wall of housing 18 and at a point between reflecting surface 23 and screen 25, is a pointer 27, the same being provided with a threaded shank 28 which is screw-seated in the wall of the housing, and that portion of the shank which projects outside the housing receives a lock nut 29. While the device is in operation, or while lamp 16 is lighted and the rays thereof are projected onto the ground glass 25, this pointer 27, being positioned in the path of said light rays, casts a shadow on the ground glass or screen, as illustrated in Figure 3, thus providing a guide to assist in the reading of the weight indicating numerals which appear adjacent to the graduated scale marks, and which latter also appear on the screen. The construction of the pointer permits it to be adjusted in the wall of the housing and the nut 29 provides means for locking the pointer in its adjusted position.

It will be understood that member 13 bearing the graduated scale and weight indicating numerals, moves vertically when loads are applied to the scale platform with which the apparatus is associated, and when said member 13 stops, the numbered graduation in line with the axes of the lenses 14 and 15, will be projected forwardly through apertures 17 and 19 onto reflecting surface 21 and from thence upwardly onto reflecting surface 23 and from thence onto the rear surface of the screen 25. The general direction of the light rays thus passing from member 13 to screen 25 is graphically illustrated by the arrows in Figure 2. Inasmuch as the light rays thus projected travel through a considerable distance, the desired magnification or increase in size will be obtained as said rays are thus projected onto screen 25 and as a result the numbered graduations can be very readily observed by the weighman or person in charge of the scales.

The use of a vertically disposed housing and reflecting surfaces not only produces the desired magnification of the weight indicating numerals and graduated marks of the scales, but brings the screen from which the readings are taken into substantially the same horizontal plane as that occupied by the eyes of the weighman or person in charge of the scales when seated or positioned immediately in front of the scale beam.

An attachment for automatic scales of my improved construction is comparatively simple, is very compact and very effective in performing its intended functions.

It will be readily understood that minor changes in the size, form and construction of the various parts of my improved automatic scale may be made and substituted for those herein shown and described, without departing from the spirit of my invention, the scope of which is set forth in the appended claims.

I claim:

1. The combination with a weight indicator for scales including a housing provided with an opening in one of its side walls, a source of light in said housing, projecting means spaced from said source of light, a transparent member provided with weight indicia and movable in vertical plane between said source of light and said projecting means, of a casing arranged on one of the side walls of said housing and provided with an opening which registers with the opening in said housing, a reflecting member arranged in the lower portion of said casing in the path of travel of the light rays from said projecting means and adapted to reflect said light rays upwardly, a reflecting member arranged in the upper portion of the casing and oppositely disposed relative to the lower reflecting member and in the path of travel of the reflected light rays, and a translucent screen arranged in the upper portion of said casing forwardly of said upper reflecting member.

2. The combination with a weight indicator for scales including a housing provided with an opening in one of its side walls, a source of light in said housing, projecting means, a transparent member provided with weight indicia and movable in vertical plane between said source of light and said projecting means, of a casing arranged on one of the side walls of said housing and provided with an opening which registers with the opening in said housing, a reflecting member arranged in the lower portion of said casing in the path of travel of the light rays from said projecting means and adapted to reflect said light rays upwardly, a reflecting member arranged in the upper portion of the casing and oppositely disposed relative to the lower reflecting member, a translucent screen arranged in the upper portion of said casing forwardly of said upper reflecting member, and a fixed pointer arranged in the upper portion of said casing between said screen and the upper reflecting member and adapted to be projected onto said screen coincidentally with said transparent member.

3. The combination with a weight indicator for scales including a housing, a source of light, and projecting means arranged in said housing, a transparent member provided with weight indicia and movable in vertical plane between said source of light and said projecting lenses, of a casing arranged exteriorly on one side of said housing and provided with an opening which registers with an opening in said housing, a reflecting member angularly disposed in the lower portion of said casing in the optical axis of said projecting lenses and adapted to reflect the projected light rays upwardly, a reflecting member angularly disposed in the upper portion of said casing and substantially parallel with the lower reflecting member, and a translucent screen arranged in the upper portion of said casing and adapted to receive the enlarged projected image of the weight indicia.

4. The combination with a weight indicator for scales including a housing, a vertically disposed transparent member arranged for movement within said housing and provided with weight indicia, light projecting means located within said housing adjacent to said transparent member, said housing being provided with an opening through which the weight indicia are projected outwardly from said housing by said projecting means, of a casing arranged on said housing and provided in one of its walls with an opening which registers with the opening formed in said housing, a translucent screen arranged in the upper portion of said casing, a plurality of reflecting surfaces arranged within said casing and adapted to reflect the projected image of the weight indicia in an enlarged form upon said translucent screen, a pointer adjustably arranged in the upper portion of said casing adjacent to said screen and adapted to be projected thereon to designate the projected weight indicia, and means for locking said pointer in adjusted position.

5. The combination with a weight indicator for scales including a vertically movable transparent member provided with weight indicia, light projecting means located adjacent to said transparent member, of a casing, a reflecting member angularly arranged in the lower end of said casing in the optical axis of said projecting means, a reflecting member arranged in the upper end of casing in co-operative relation with the first mentioned reflecting member, a translucent screen arranged in the upper portion of said casing and spaced forwardly of the last mentioned reflecting member, whereby the weight indicia are projected by said projecting means and said reflecting members in an enlarged form upon said screen and a stationary pointer arranged adjacent to said screen and adapted to be projected onto said screen to form an indicia selecting mark.

6. The combination with a weight indicator for scales including a vertically movable transparent member provided with weight indicia, light projecting means located adjacent to said transparent member, of a casing, a reflecting member angularly arranged in the lower end of said casing in the optical axis of said projecting means, a reflecting member arranged in the upper end of said casing in co-operative relation with the first mentioned reflecting member, a translucent screen arranged in the upper portion of said casing and spaced forwardly of the last mentioned reflecting member, whereby the weight indicia are projected by said projecting means and said reflecting members, in an enlarged form upon said screen, and means secured to said casing and designed to be projected onto said screen and fix the position of the projected weight indicia.

In testimony whereof I hereunto affix my signature this 10th day of September, 1918.

HENRY C. SCHAPER.